July 5, 1966  A. BERANGER  3,259,296
TUBULAR CONTAINER MADE OF FLEXIBLE MATERIAL
Filed June 4, 1962  4 Sheets-Sheet 1
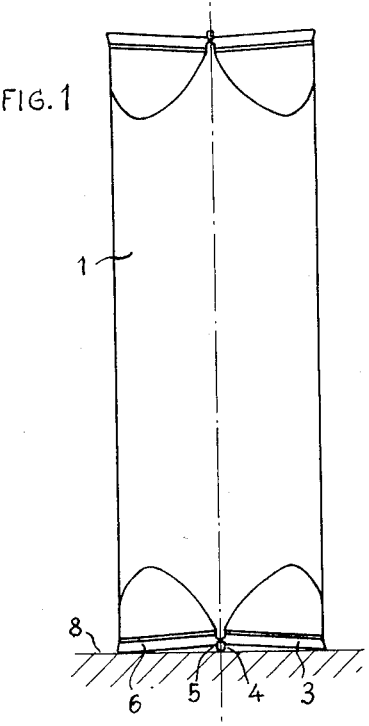
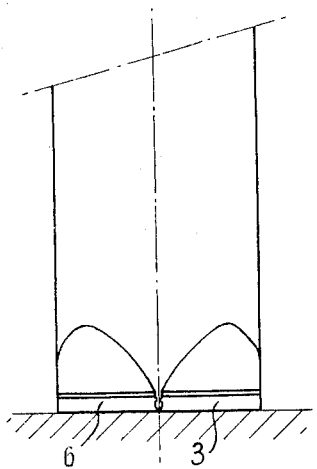
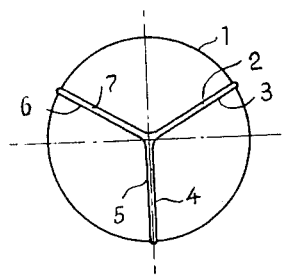

July 5, 1966  A. BERANGER  3,259,296
TUBULAR CONTAINER MADE OF FLEXIBLE MATERIAL
Filed June 4, 1962  4 Sheets-Sheet 2

United States Patent Office 3,259,296
Patented July 5, 1966

1

3,259,296
TUBULAR CONTAINER MADE OF FLEXIBLE MATERIAL
Antoine Beranger, 8 Rue Guerin, Charenton, Seine, France
Filed June 4, 1962, Ser. No. 199,789
3 Claims. (Cl. 229—5.5)

This invention relates to generally tubular shaped containers made of flexible material. By flexible material is to be understood any material, such as plastics, cellulose, cardboard or metal (particularly metals with relatively low melting points), suitable for shaping into a flexible container.

In particular, the invention concerns tubes made of plastic material. Tubes of this type are often sealed by flat welding or by welding on a circular end-piece. In the former case the tubes cannot be stood upright, while in the latter case their cost is relatively high. In addition, flat welding considerably reduces the capacity of a tube for a given lateral surface area, while at the same time increasing its bulk.

It is the object of this invention to provide a container made of flexible material, of which at least one end is so sealed that it is possible to place the container in a stable upright position, the cost of such a container being furthermore very low and its capacity substantially greater than that of a container sealed by conventional flat welding.

A container according to this invention accordingly has at least one of its ends sealed by means of intersecting lips formed by pinching the end portion of the container wall, flat-welding said lips, the free ends of the latter being contained in a common plane transverse with respect to the axis of said container, whereby the container is able to stand upright on any convenient horizontal supporting surface.

The accompanying drawing illustrates, by way of example only and not of limitation, a few possible embodiments of the container according to the present invention.

Figure 5:
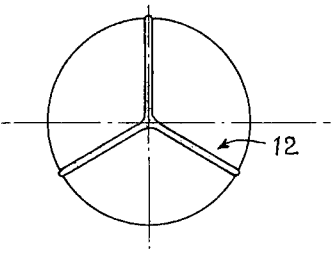
Figure 4:
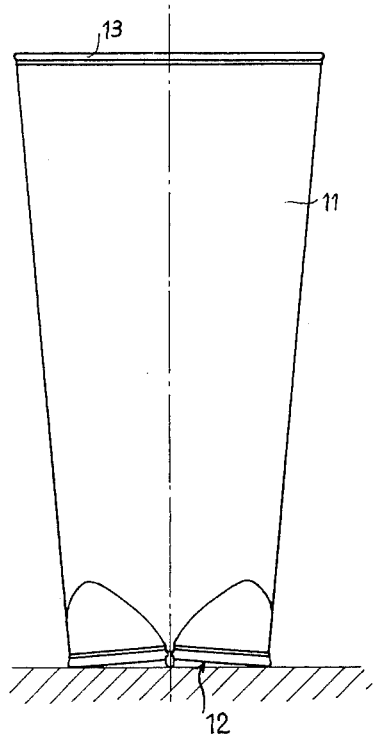
Figure 6:
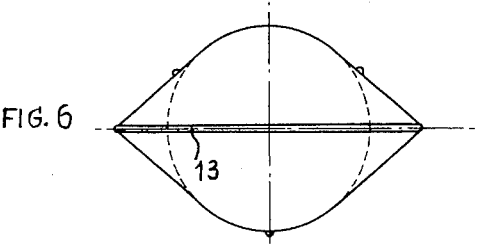
Figure 8:
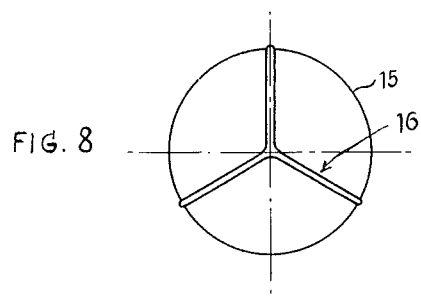
Figure 7:
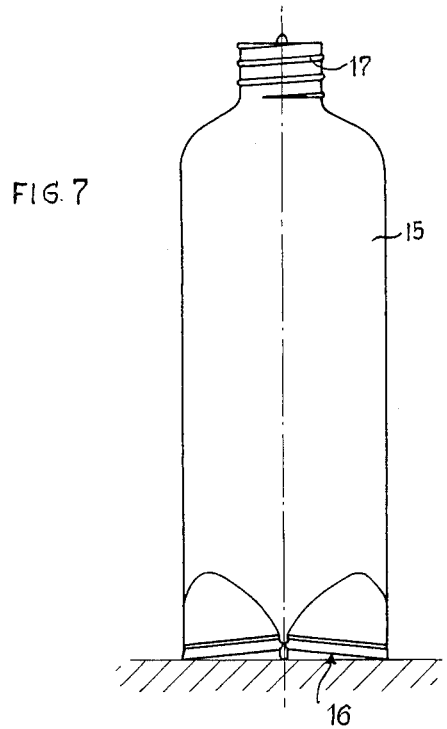

Referring to the drawing filed herewith:
FIGURE 1 is a view in elevation of a flexible plastic tube the two ends of which have been sealed by the method according to this invention.
FIGURE 2 is a plan view corresponding to FIGURE 1.
FIGURE 3 is an alternative embodiment of an end of the tube shown in FIGURE 1.
FIGURE 4 is a view in elevation of a plastic tube of which one end has been sealed by the method according to the invention and the other end by conventional flat welding.
FIGURE 5 illustrates the shape of the bottom of the tube represented in FIGURE 4.
FIGURE 6 is a plan view of the tube in FIGURE 4, as seen from above.
FIGURE 7 is a view in elevation of an alternative type of tube, the bottom of which is sealed by the method according to this invention and the other end adapted to receive a threaded plug.
FIGURE 8 is an external view of the bottom of the container of FIGURE 7, and
FIGURES 9 to 11 illustrate alternative embodiments of tube ends welded according to this invention.

The container shown in FIGURES 1 and 2 consists of a cylindrical plastic tube 1, the two ends of which have been sealed by flat-welding lips 2–3, 4–5, and 6–7 each being obtained by pinching the corresponding end portion of the tube wall itself, lip portion 2 being welded to lip portion 3, lip portion 4 to lip portion 5, and lip portion 5 to lip portion 7.

In the specific embodiment, said lips extend radially outwards from the geometrical axis of the tube. They are three in number, being spaced at 120° from one another and slightly inclined from the axis towards the periphery and towards the tube end, in such manner that only the free ends of said lips, i.e. those portions which are located next the tips of the three-pointed star formed in this way, are able to bear against a horizontal supporting surface such as the surface denoted by the reference numeral 8.

The tube can thus be placed upright by standing it on the tripod formed in this way by the ends of the lips.

It is to be noted that the tube is only slightly deformed near the end and that the capacity of the tube consequently is barely diminished as compared to the capacity of the original tube cylinder prior to pinching and welding. Nor is there any substantial increase of the width of the tube end as occurs when flat welding is resorted to, so that the dimensions of the tube end sealed in this way are not substantially larger than those of the extremity of the corresponding cylindrical tube portion.

In the alternative embodiment illustrated in FIGURE 3, all the welded lips, such as lips 3 and 6, have their entire lengths contained in the transverse plane which passes through the three bearing points consisting of the free ends of said lips. The tube therefore rests on the surface 8, being supported by the three edges forming the star previously referred to.

In the embodiment shown in FIGURES 4 to 6, the tube 11 has its bottom end sealed in identical fashion to the two extremities of the tube in the embodiment of FIGURES 1 and 2, i.e. sealed to the shape of a three-pointed star generally designated by the reference numeral 12, while its other extremity is sealed by a conventional flat weld 13. This is a particularly economical embodiment.

In still another embodiment, which is represented in FIGURES 7 and 8, the tube 15 has a star-sealed bottom 16 identical to that hereinbefore described, while its other end is adapted to receive a plug and is accordingly provided for example with a threaded neck 17.

Figure 9:
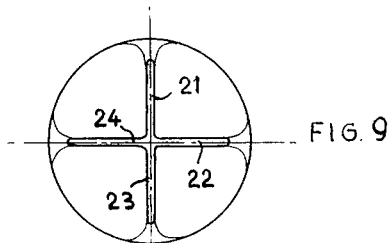

FIGURE 9 illustrates an alternative form of tube end sealed according to the invention, in which the lips forming the star are four in number and respectively designated by reference numerals 21, 22, 23 and 24.

Figure 10:
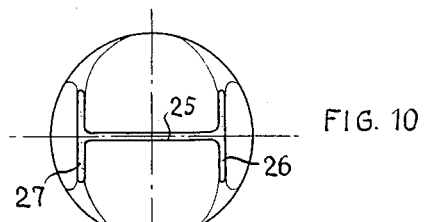

In the embodiment shown in FIGURE 10, the lips 25, 26 and 27 have an overall I-shaped configuration.

Figure 11:
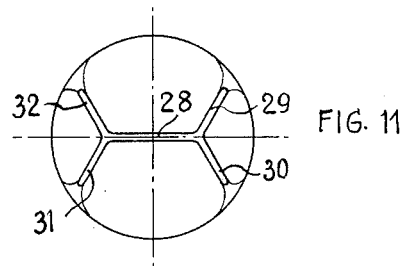

In the embodiment illustrated in FIGURE 11, the lips 28, 29, 30, 31 and 32 have an overall double-Y configuration the median branches of which are coextensive.

The reference to "welding" or "flat-welding" as applied in the present specification and appended claims is to be understood as covering not only the well known physical or chemical methods of joining part, as e.g. by "fusing" (i.e. application of heat), but also any other convenient way of producing a bond, such as for instance gluing or bonding by the action of a solvent, or of some other substance added to the material to be bonded.

It will of course be understood that, irrespective of the method of execution adopted, the lips may be so shaped that they bear on a horizontal supporting surface only through their tips, or, on the contrary, over at least a certain portion of their lengths.

What is claimed is:
1. A tubular container made of a flexible material at least one end of which is sealed by a plurality of lips formed by pinching the end portion of the container in a plurality of zones thereof and bonding the respectively opposed inner surface portions of the pinched container end zones together, said plurality of lips comprising at least three lips which intersect at a common intersecting point located on the longitudinal axis of the tubular container, said three lips extending along generatrices of a cone which is coaxial with the container and which has its apex at said common intersecting point and which extends outwardly of the container from said apex, the free ends of said lips being located in a common plane normal to the container axis.

2. A tubular container of flexible thermoplastic material at least one end of which is sealed by three lips formed by pinching the end portion of the container in three zones thereof and flat-welding the respectively opposed inner surface portions of the pinched container end zones together, said lips intersecting at a common intersection point on the longitudinal axis of the container and extending in respective radial planes each of which intersects the two other radial planes at an angle of 120°, and said lips being defined by respective generatrices of a cone coaxial with the container and having its apex at said common intersection point, the base of said cone being located at a distance from said apex outwardly of the container, and the respective free ends of said lips being located in a common plane perpendicular to said container axis.

3. A tubular container of flexible thermoplastic material at least one end of which is sealed by four lips formed by pinching the end portion of the container in four zones thereof and flat-welding the respectively opposed inner surface portions of the pinched container end zones together, said lips intersecting at a common intersection point on the longitudinal axis of the container and extending in two perpendicular planes, and said lips being defined by respective generatrices of a cone coaxial with the container and having its apex at said common intersection point, the base of said cone being located at a distance from said apex outwardly of the container, and the respective free ends of said lips being located in a common plane perpendicular to said container axis.

References Cited by the Examiner

UNITED STATES PATENTS

| | | |
|---|---|---|
| 2,058,251 | 10/1936 | Nitardy et al. |
| 2,189,174 | 2/1940 | Hohl _____ 229—66 |
| 3,041,802 | 7/1962 | Cummings et al. |
| 3,051,368 | 8/1962 | Schneider et al. _____ 229—17 |

FOREIGN PATENTS 494,547  10/1938  Great Britain.

THERON E. CONDON, *Primary Examiner.*

EARLE J. DRUMMOND, GEORGE O. RALSTON,
*Examiners.*

J. M. CASKIE, *Assistant Examiner.*